Nov. 1, 1927.
T. E. BART
1,647,334
SELF DRAINING VALVE STRUCTURE
Filed May 25, 1927
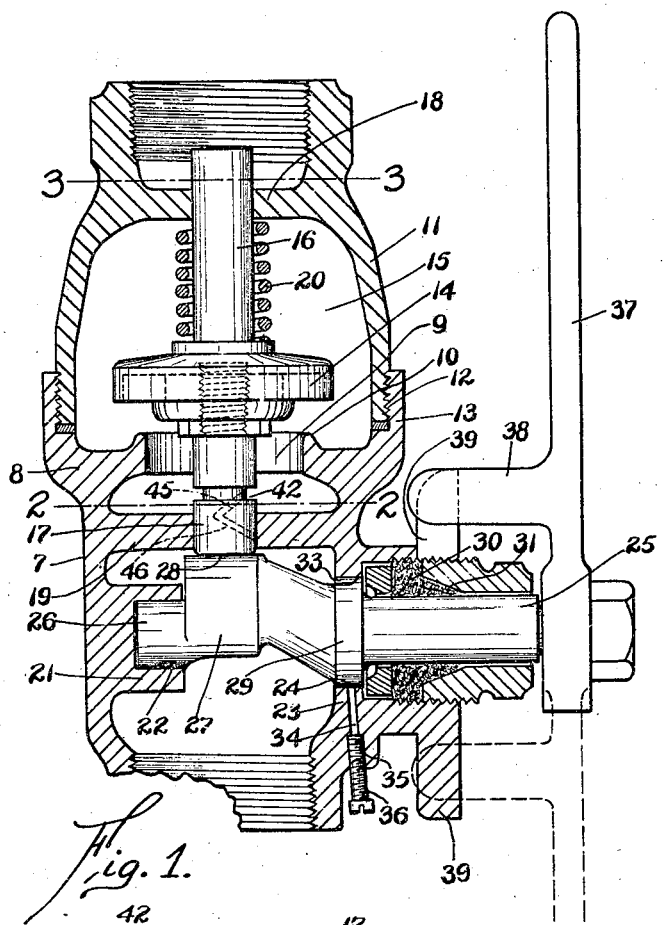
Fig. 1.
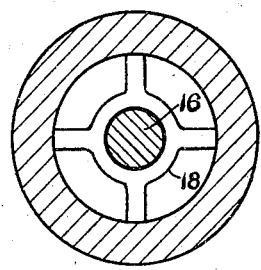
Fig. 3.
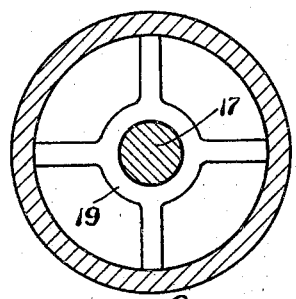
Fig. 2.
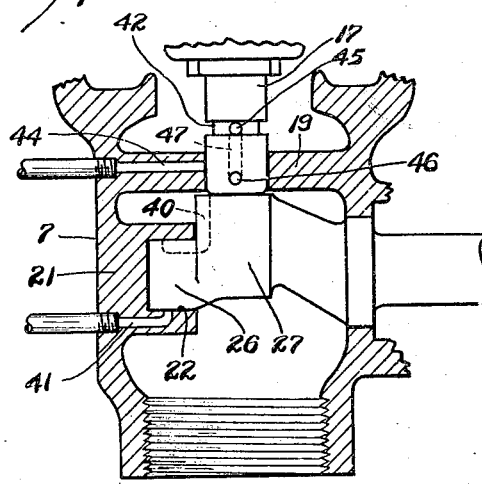
Fig. 5.
Fig. 4.
Inventor
Thomas E. Bart,
By Murray and Zugelter
Attorneys Patented Nov. 1, 1927.

1,647,334

UNITED STATES PATENT OFFICE.

THOMAS E. BART, OF CINCINNATI, OHIO, ASSIGNOR TO THE MURDOCK MANUFACTURING AND SUPPLY COMPANY, OF CINCINNATI, OHIO, A CORPORATION OF OHIO.

SELF-DRAINING VALVE STRUCTURE.

Application filed May 25, 1927. Serial No. 194,192.

This invention relates to valve structures for controlling fluids and has for an object the provision of a valve structure wherein the outlet chamber is self draining.

Another object is to provide a structure of the class referred to wherein the normal valve structure is so arranged as to be substantially leak-proof when the valve is in open position, and to automatically establish communication between the interior and exterior of the outlet chamber when the valve is closed, thereby insuring perfect drainage in order to avoid freezing or other undesirable effects incident to the retention of fluid within the outlet chamber.

These and other objects are attained by the means described herein and disclosed in the accompanying drawings, in which:

Fig. 1 represents a longitudinal section of a valve of the invention showing one means for attaining drainage of the outlet chamber.

Fig. 2 is a cross sectional view on line 2—2 of Fig. 1.

Fig. 3 is cross sectional view on line 3—3 of Fig. 1.

Fig. 4 is a perspective view of the valve actuating shaft as shown in Fig. 1.

Fig. 5 is a fragmental sectional view showing two additional means for effecting drainage of the outlet chamber.

In the herein disclosed embodiment of the invention, a valve of a quick acting type is shown. Said valve comprises a casing 7 having a web 8 provided with a fluid passage 9 surrounded at its top by an integral valve seat 10. A bonnet 11 is adapted to be screw threaded as at 12 upon a flange 13 extending above the web 8. A valve 14, disposed in the inlet chamber 15, has an upper guide stem 16 and a lower guide stem 17 mounted for reciprocation in open guide members 18 and 19 in the bonnet and casing. A spring 20 abutting the top of valve 14 and the lower face of guide member 18 serves to normally retain the valve 14 upon valve seat 10. The casing 7 is provided with an inwardly extending projection 21 having a bearing seat 22. The side wall 23 of casing 7 has an opening 24 aligned with the bearing seat 22. An actuating shaft 25 has a bearing 26 at its one end which is seated in the recess 22. An eccentric cam 27 is disposed adjacent the bearing 26 and is adapted upon rotatory movement of the shaft 25 to abut the end 28 of lower guide 17 for raising the valve 14 against the resistance of the spring 20. A cylindrical flange portion 29 on the shaft 25 closes the opening 24 in wall 23 and also serves as a bearing for the shaft 25. Suitable packing 30 and a packing nut 31 serve to retain the shaft 25 against lateral displacement and to provide against leakage between cylindrical flange 29 and the edge of opening 24. As shown in Figs. 1 and 4 the cylindrical flange 29 on shaft 25 is notched through the inner face 32 and through the circumference at 33 on the side adjacent the highest portion of eccentric cam 27. The wall 23 of casing 7 has a perforation 34 extending through the wall of opening 24 and communicating with the exterior of the casing. The outer end 35 of perforation 34 may be threaded for receiving a plug 36. A suitable operating handle 37 having an inwardly projecting finger 38 is rigidly fixed to the free end of shaft 25 and serves to actuate said shaft through one-half revolution between integral stops 39 on the casing 7. From the foregoing it will be apparent that when the handle 37 is raised the shaft 25 is rotated and raises the cam 27 for opening the valve to the position shown in Fig. 1. At this time the notch 33 in flange 29 is diametrically spaced from the perforation 34 so that the perforation is closed by the body of the flange. When the valve is to be closed, the handle 37 has moved in the opposite direction for a distance whereupon the pressure of the spring operating on cam 27 which has been moved past dead center serves to close the valve and to dispose the cam 27 and the notch 33 in flange 29 to a position wherein the valve 14 is urged upon its seat 10 closing the passage 9. At the same time the notch 33 is placed in communication with the passage 34 so that fluid within the outlet chamber in casing 7 may drain off through passage 34 when the plug 36 is removed.

Fig. 5 shows two additional means for effecting drainage of the outlet chamber. It will be understood that these methods may be employed either individually or in any desired combination which may include the drainage feature shown in Fig. 1. When any of the drainage means are used, the outlet chamber will rapidly drain regardless of the position in which it may be found in practical installations.

The bearing 26 and cam 27 on shaft 25 is notched as at 40 as to provide a passage between the interior of the outlet chamber and the bearing recess 22. A bore 41 through casing 7 serves to establish communication between the outlet chamber and the exterior of the casing through passage 41 and notch 40 when the cam 27 is in a lowered position. At this time, as will be understood the valve is in a closed position.

In the modified form shown in Fig. 5 the lower guide 17 has an annular groove 42 which is closed by the body of guide 19 when the valve is closed. A bore 44 in guide 19 at that time establishes communication between the groove 42 and the exterior of the casing. A radial bore extends from the bottom of the groove 42 for a distance into the body of stem 17 and connects with a second radial bore 46 through a short longitudinal bore 47. When the valve is open as shown in Fig. 5, the bore 46 is sealed by the wall of the guide 19 so that the fluid under pressure in inlet chamber 15 can not find its way out of the casing by way of the passage mentioned. When the valve is closed however the stem moves into the outlet chamber establishing communication between the interior of the outlet chamber and radial perforation 46. At the same time the annular groove 42 is in communication with the bore 44 so that any fluid or liquid within the outlet chamber may be drained off through perforation 46, bore 47, perforation 45, groove 42 and bore 44. Radial perforation 46 is preferably so positioned within the guide stem as to preclude coincidence of perforation 46 and the bore 44 at any time.

The cam 27 is so arranged as to be slightly clear of the bottom end 28 of the stem 17 when the cam is in its lowermost position and thereby insuring perfect closing of the valve 14 under the influence of spring 20 and such pressure as may be present in the chamber 15. This makes it impossible to leave the valve but partly open and also affords drainage only when the valve is completely closed.

It will be understood that the bores 41 and 44 may be closed, if desired, by threaded plug such as 36, or tubular extensions may be provided for carrying off the drainage from the outlet chamber.

As indicated in Fig. 1, the bores 45 and 46 may be drilled angularly one to the other so as to avoid the necessity for the longitudinal bore 47 in the stem.

What is claimed is—

1. In a self draining valve the combination of a casing having an outlet chamber, an extension in said outlet chamber having a bearing recess therein, the casing having a bore therethrough providing communication between the bearing recess and the exterior of the casing, an actuating shaft journaled in the bearing recess and having a groove therein in such position as to establish communication between the groove and the bore when the actuating shaft is in one position, the journaled bearing of the shaft in all other positions serving to seal the bore in the casing.

2. In a valve structure the combination of a casing having a bearing opening therein, an actuating shaft journaled in said bearing and having a transverse notch in said journaled bearing, the casing having a drainage bore establishing communication between the bearing bore and the exterior of the casing for providing drainage between the interior of the casing and the exterior thereof when the transverse notch in the shaft coincides with the drainage perforation.

3. In a self draining valve structure the combination of a valve casing, a guide member in the casing having a guide bore and a drainage bore establishing communication between the guide bore and the exterior of the casing, a valve, a guide stem reciprocable in the guide bore and having an annular groove therein coinciding with the drainage bore in the guide member when the valve is in one position, said stem having a pair of spaced transverse perforations and a connecting longitudinal perforation, one of said perforations opening into the annular groove in said stem, and means for moving the guide stem whereby to at times establish communication between the annular groove and the drainage bore in the casing, and at other times, to position the stem so that one of the transverse bores will be sealed by the wall of the guiding bore.

4. In a valve structure the combination with a casing having a valve seat therein, for providing an inlet and an outlet chamber in the casing, a valve in the casing, a guide stem on the valve extending into the outlet chamber, a guide member in the outlet chamber having a drainage bore, the valve stem normally sealing said drainage bore, said stem being provided with an annular groove adapted at times to be in communication with the drainage bore, and with a pair of spaced communicating transverse bores, one of which opens into the annular groove and the other of which is disposed at times below the guide member and in communication with the outlet chamber and at other times within the guide member and sealed thereby, and means for effecting reciprocation of the valve stem.

In testimony whereof, I have hereunto subscribed my name this 23rd day of May, 1927.

THOMAS E. BART.